July 16, 1957        J. SUNNEN        2,799,127
HONING DEVICE
Filed July 23, 1951        2 Sheets-Sheet 1
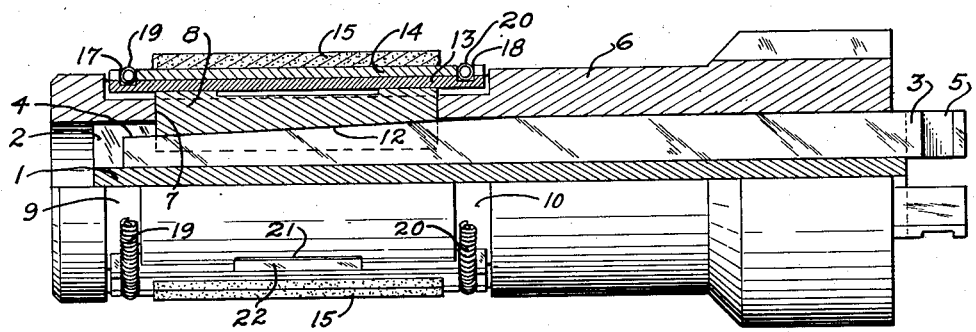
FIG.1.
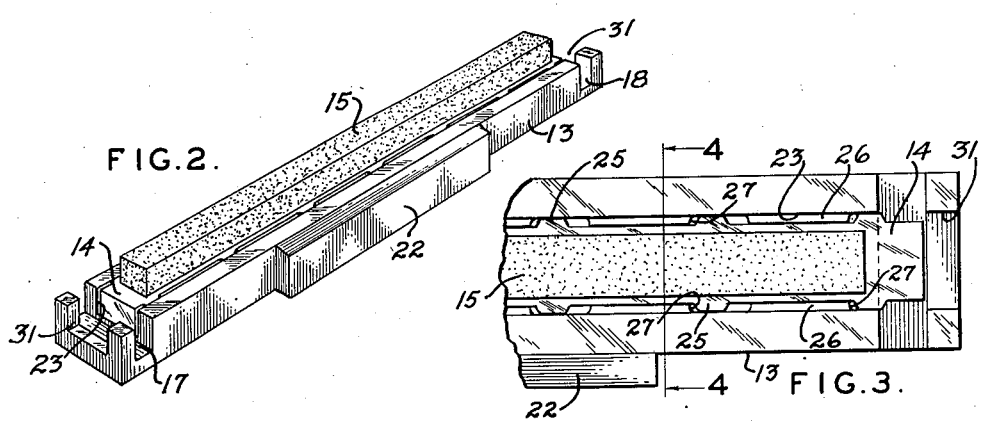
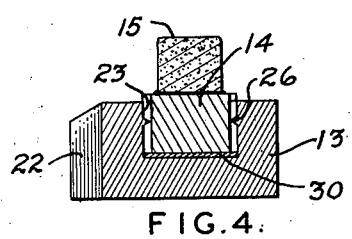
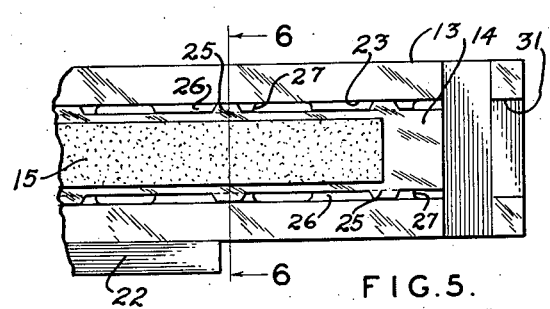
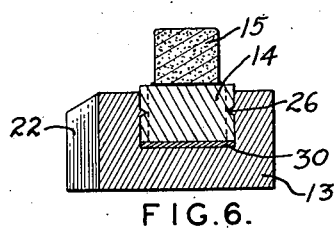
INVENTOR.
JOSEPH SUNNEN
BY *George R. Ericson*
ATTORNEY July 16, 1957  J. SUNNEN  2,799,127
HONING DEVICE Filed July 23, 1951 2 Sheets-Sheet 2

*INVENTOR.*
JOSEPH SUNNEN
BY
ATTORNEY

United States Patent Office 2,799,127
Patented July 16, 1957

2,799,127
HONING DEVICE
Joseph Sunnen, Clayton, Mo.

Application July 23, 1951, Serial No. 238,118

7 Claims. (Cl. 51—184.3)

This invention relates to honing machines and more particularly to the means of securing the stone to the expansible jaw in an expansible hone arbor.

In the prior art the expansible jaw itself usually had the stone cemented directly to it so as to form the hone and hone support integral with the jaw. This is not entirely satisfactory because the jaw has to be made very accurately, usually of hardened and ground steel, is quite expensive and the cementing operation requires the facilities of a well-equipped shop and a well-trained technician.

It will be understood that the expansible jaw must in any case be carefully and accurately constructed so as to form an accurate and very rigid support for the hone. The objection lies in the fact that the hones themselves must be frequently replaced as the result of wear in normal use while the jaw may last almost indefinitely, so that necessity of replacing the expensive jaw and hone support every time a hone is worn out is uneconomical.

My invention is suitable for use with stone for arbors of any desired type and having any number of jaws, as for instance the single jaw shown in my Patent No. 1,913,689, issued June 13, 1933, or the plurality of jaws shown in my Patents No. 1,902,194, issued March 21, 1933, and No. 2,421,470, issued June 23, 1947, and any others which may be desired.

In the particular installation shown the jaws are carried by an arbor and expanded by means of wedges or the like and some or all of the expansible jaws carry a hone element which includes the metal hone support or backing having an abrasive element called the stone or hone cemented thereto.

An object of this invention is to provide a combination of improved jaw and hone support and a very inexpensive hone and hone mounting constructed and arranged in such a manner as to be firmly attachable to the jaw and hone support and easily replaceable without skilled labor and without substantial cost.

One of the objects of the invention is to provide a replaceable stone for a hone of this type rather than replaceable jaws, as have been used in the past.

One of the objects of the invention is to provide a rigid and secure lock between the replaceable stone and the jaw, which is readily releasable.

One of the objects of the invention is to provide a lock of this type which has both a wedging and a shearing action on the backing member for securing it rigidly in place.

One of the objects of the invention is to provide a locking means readily releasable but secured by shearing and wedging in several directions between the engaged surfaces.

Referring to the drawings:

Fig. 1 is a view partly in section of a honing tool according to this invention.

Fig. 2 is a perspective view of the assembly of jaw and backing member according to the invention.

Fig. 3 is a plan view illustrating the first step in assembling the backing member with the jaw.

Fig. 4 is a cross-sectional view on the line 4—4 of Fig. 3.

Fig. 5 is a plan view illustrating the backing member locked in engagement with the jaw.

Fig. 6 is a sectional view on the line 6—6 of Fig. 5.

Figure 7:
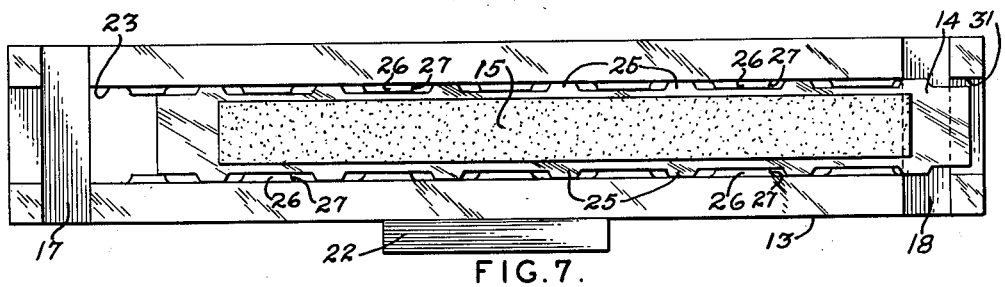
Fig. 7 is a view similar to that in Fig. 3 illustrating one modification of the backing member and jaw of Fig. 3.

In the drawings Fig. 1 illustrates a honing tool embodying the present invention. This particular tool has a plurality of hone elements some or all of which are expansibly mounted. The number which are so mounted in any tool is immaterial to the invention as will become apparent as the description proceeds.

The tool has an arbor 1 formed with a plurality of slots extending longitudinally of the arbor, one of which is indicated at 2. A slot is provided for each of the expansible hone elements in the tool and since each is identical only one will be described. Slidably mounted in the slot is a wedge element 3 formed at one end with an inclined wedging surface 4 and at the other with a hook 5 by which the wedge element may be moved longitudinally of the slot 2 in the arbor 1. Telescopingly mounted with respect to the arbor is a holder 6 which has at its one end a plurality of circumferentially spaced radial slots 7 extending lengthwise of the holder and dimensioned to receive the shoes 8. At each end of the slots 7 are circumferential recesses 9 and 10 communicating with the slots 7.

Shoe 8 is recessed at its inner edge to receive the wedge element 3 flush with a side surface thereof and the recess is formed with an inclined surface 12 coincident with the inclined surface 4 on wedge element 3.

The outer surfaces of the shoes are provided with spaced flats which support the jaws 13, and in the jaws are secured the stone backing elements 14 which mount the stones 15. Jaws 13 are provided at each end thereof with transverse slots 17 and 18 which, when the jaws are in place upon the holder, are in alignment with circumferential recesses 9 and 10 in the holder. The assembly of shoes, jaws and backing members are maintained in working relation by means of circumferential helical springs 19 and 20 received in the slots 17 and 18 of the jaw members, and by the recesses 9 and 10 of the holder between the jaw members. To maintain the jaw members against longitudinal sliding movement when assembled with the holder, the slots 7 are provided with a radial extending key-way 21 which receives the keeper 22 formed integrally with the side face of the jaw members.

In the honing tool illustrated in Fig. 1, it will be obvious that the rotation of the arbor will in turn rotate the holder, shoes, jaws and stones carried therein, and that longitudinal motion between the wedges 3 and the holder 6 will produce a reaction on the wedging surfaces 12 of the shoes to expand the cutting elements or stones 15.

The description so far relates to a more or less conventional arrangement of parts in a honing tool, and is intended for the purpose of conveying a better understanding of the invention as will be described, with reference to the other figures in the drawings.

Figs. 2 through 6 are regarded as illustrative of one embodiment of the instant invention.

Referring to Fig. 2 it will be seen that the jaws of the present invention are formed with a channel 23 extending from one end of the jaw to the other in which is mounted the stone backing member 14 and the attached stone 15. As shown in Fig. 2, the parts are in assembled relation, and by reference to the other figures, 3, 4, 5 and 6 of this group it will be illustrated how the parts are intended to be interconnected and the steps in the method of interconnection between the jaw 13 and the stone backing member 14. The backing member 14 is formed with a series of bosses 25 on each side thereof. The upper and lower surfaces of the backing member 14 are merely flat, plain surfaces in parallel relation to one another.

Fig. 3 shows the parts in assembled relation, but not locked to one another. In this figure the bosses 25, as will be noted, are placed in the channel 23 of the jaw 13. The jaw 13 in turn is formed with a series of die members 26 facing inwardly from each side of the channel 23 and spaced upwardly from the bottom of the same slightly more than halfway. These die members 26 resemble the die threads on a tap, in that they are V-shaped and interrupted providing the spaces to receive the bosses 25 when the parts are dropped one into the other as illustrated in Fig. 2, and by the sectional view in Fig. 4. Die members 26 are formed at their leading edges with an abrupt shearing face 27. This can be seen by reference to Fig. 3 for example.

The die members 26 are spaced apart further than the lengthwise dimensions of the bosses 25, and the first assembly step is to drop the stone backing member 14 into engagement with the bottom of the channel 23.

The final assembly step in affixing the backing member to the jaw is illustrated in Figs. 5 and 6. In Fig. 5 the backing member has been forced to the left with respect to the jaw, thereby engaging the die-like members 26 with the boss members 25 on the backing member. The amount of force required to cause the die members to shear the boss members will vary in accordance with the size and structure of the parts and the nature of the metals used. These parts may be assembled to produce the shearing action by an assembly such as a press which may be equipped to join either a single stone backing in its recess or may be equipped to seat several at the same time. Likewise, the applied pressure may be manual by any desired or available means to accomplish the proposed results.

The amount or degree which the stone or hone projects from the jaw may be determined by inserting a shim 30 between the bottom of channel 23 and the backing member 14. The die elements 26 will cut grooves in bosses 25 at different levels depending on the thickness of the shim used.

Referring to Fig. 6 it may be seen how the die members 26 cut into the boss members 25 and wedge the metal of the backing member in a direction downwardly against the bottom of the channel or shim, thereby frictionally and compressively locking the two members together. The die members have a combined shearing and compressing effect upon the backing member to anchor the assembly together in a secure manner, and yet the backing member can be easily freed from the jaw by a blow directed in the opposite direction on the backing member to knock the two from engagement with one another.

Figs. 2, 3 and 5 illustrate how the end of the jaw member is slotted at 23 and 31 to permit this endwise movement to free the backing member from the jaw. The keeper 22 which locks the jaw against longitudinal movement of the holder is shown in detail in Figs. 2, 3, and 5. In this modification the die members 26 extend at spaced intervals lengthwise of, and parallel to, the bottom of the channel 23 throughout their length. But it is quite obvious that these die members could be inclined slightly downwardly in order to further add to the compressive force of the backing member against the bottom of the channel or shim, in a similar way that a lead is provided on a thread. If such a modification is deemed desirable, it might easily be applied to this embodiment of the invention.

The die elements 26 of this embodiment are spaced apart equal distances to provide clearance with the boss elements on the backing member, so that when the backing member is moved or forced endwise with respect to the jaw the die elements engage each of the boss elements substantially simultaneously. In this respect it differs from the embodiment in Fig. 7 which will now be described.

Fig. 7 is illustrative of a second embodiment of the invention, practically identical with the first, and differing therefrom only in the mentioned respect. The construction is almost identical, and corresponding parts are referred to by the same reference characters. The shoe member 8 is constructed of hardened tool steel machined to mate with surfaces on the wedges. The outside of the jaw member is formed with a channel 23 extending from end to end thereof and is slotted at 17 and 18 for the retaining helical springs which mount the jaw on the tool. The channel is provided with oppositely inwardly facing die elements 26 with abrupt leading and shearing edges 27 in a manner similar to that above described. The backing member 14 is a soft steel and is provided with the side bosses 25, as in the previous Fig. 3, and upper and lower parallel surfaces, upon one of which the stone is mounted. The other engages the bottom of the channel of the jaw 13. The opposed bosses on the sides of the backing member are each of equal size and length as in the previous embodiment, but the die members 26 facing inwardly from the sides of the channel are not the same length. The die members 26, as can be seen, vary in length from one end of the channel to the other in a progressive manner; whereby the gaps between, which receive the boss elements 25 of the backing member 14 are of different and progressively increasing length from right to left of the channel.

In an arrangement such as this described, the locking action of sliding the backing member with respect to the jaws, produces not a simultaneous engagement of each of the die elements with the bosses as described in the previous embodiment, but one which is sequential in nature, in that each pair of opposite bosses from right to left is successively engaged by the die elements. This provides for an easier force to produce the locking motion between the two and also a lighter blow or forcing action is required to free the backing member from the jaw.

Figure 8:
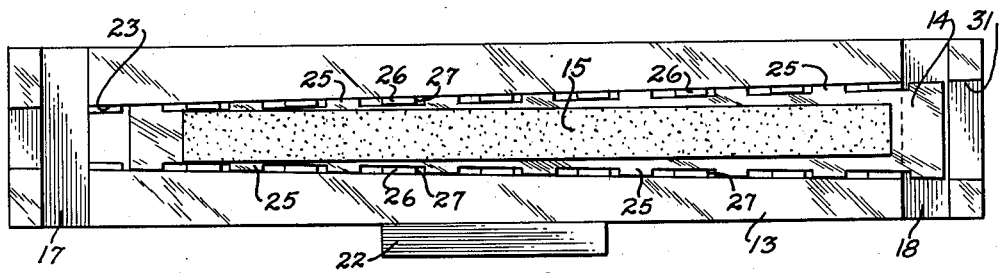
Fig. 8 is a plan view of a second modification of the invention.

The Fig. 8 is regarded as illustrative of a third embodiment of the instant invention. The same reference characters have accordingly been used to indicate corresponding parts in this embodiment. Here again is provided a jaw 13 formed with a channel 23 extending from end to end thereof to facilitate the entry and removal of the backing member in the jaw. This embodiment differs from the ones previously described in that the sides of the channel 23 are tapered inwardly from right to left as shown. Likewise, the bosses 25 on the sides of the backing member 14 are correspondingly tapered to fit in the channel 23. Inwardly facing die elements 26 having square leading edges 27 are provided in the channel 23. This type of cutting edge 27 will produce a broaching action on endwise engagement with bosses 25. The dies 26 are spaced apart sufficient to receive the bosses and the backing member can be dropped downwardly into the channel 23. The locking is produced by endwise motion of the backing member with respect to the channel, and backing member 14 will thereby be secured within the channel of the jaw 13 by shearing of the metal in the bosses by the dies and by compression progressively applied by the channel walls.

Figure 9:
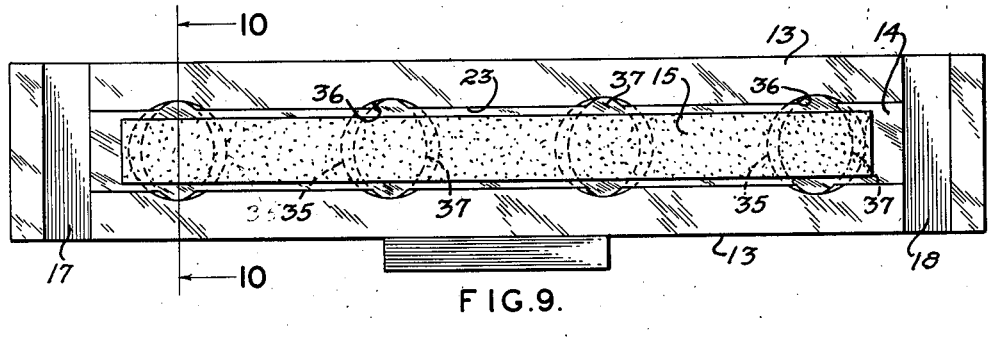
Fig. 9 is a plan view of a third modification of the invention.
Figures 10, 11:
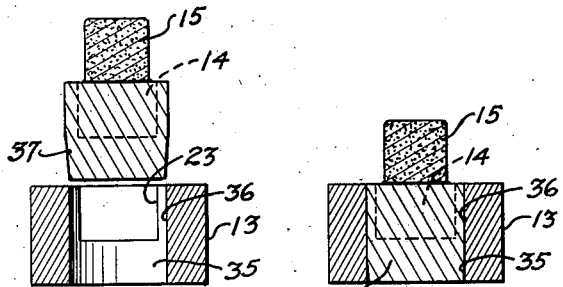
Fig. 10 is a view in section on the line 10—10 showing the parts of Fig. 9 ready for interengagement.
Fig. 11 is a view on the line 10—10 of Fig. 9 showing the parts of Fig. 9 assembled.

Figs. 9, 10 and 11 are regarded as illustrative of still a third modification of the instant invention. Similar reference characters have been used to indicate identical parts which correspond to those of the previous modifications. Here again the jaw member 13 is formed with a longitudinal channel 23 extending between slots 17 and 18 transverse of the jaw member 13 for receiving the retaining springs 19 and 20 to hold the jaw member in the tool. This embodiment is specifically adapted to the use of a die-cast backing member 14 for the stone or hone 15, and is accordingly constructed to accommodate the variation in lengthwise dimensions between the parts of the backing member 14 which can result from a casting operation.

Spaced lengthwise along the channel are a series of dies 35 which may be slightly elongated lengthwise of the channel and not strictly round holes, so as to accommodate any expansion or shrinkage in the die-cast backing member. These dies 35 extend outwardly into the sides of the channel, forming recesses as shown at 36. The backing member which is adapted for use with this arrangement of jaw structure is provided with upper and lower parallel surfaces to one of which the stone 15 is cemented. Opposite the stone or hone a series of integral bosses, tapered outwardly of the backing member 14, and wider in cross section transversely thereof, extend downwardly from the top surface and protrude from the sides and lower surface of the backing member for engagement with the above-mentioned dies and recesses 35 and 36 respectively. These die-cast bosses 37 on the backing member 14, are dimensioned to be slightly larger in a transverse channel direction than the dies that receive them.

Fig. 10 shows such a device ready for engagement of the backing with the jaw member in which the bosses 37 are superposed in alignment with the die parts 35 and 36 in the jaw.

Fig. 11 shows the parts in final engagement locked together in which the backing member 14 has been pressed downwardly into the channel and the jaw 13. Since the bosses on the backing member are slightly larger in a transverse channel direction than are the receiving holes, again, a shearing action and a compressing action will take place on the bosses, locking the parts together. The excess metal cut from opposite sides of the bosses due to the shearing action of the die-like edges of the tool steel jaw member will find clearance in the ends of the holes lengthwise of the jaw member.

An invention has been described and illustrated which in its several embodiments will fulfill the objects set forth in the above description. According to the invention, each of the jaws in the tool may be removed quickly, and the easily replaceable backing member carrying the cutting stone may be placed in the jaw, and the jaw subsequently returned into the tool.

In each of the embodiments, the backing member is held in place by a similar locking arrangement produced by a shearing action on the metal of the backing member to securely lock it in place in the jaw. The honing tool when so modified may be quickly supplied with new hone or stone in the manner described and discussed above, so as not to delay the production of the tool. All this is accomplished without the use of an extra supply of expensive tool steel jaw members. The actual steps of locking the backing member into the jaw may be accomplished easily and quickly.

The above embodiments are illustrative of the invention and should not be regarded as limiting the invention to the particular devices shown. Obviously other and similarly acting structures could be produced without involving any invention, and all such structures which fall within the terms or limits of the following claims are regarded as a part of this invention.

I claim:
1. In an expansible hone, a generally cylindrical holder having a longitudinal slot therein, an elongated detachable jaw member mounted in said slot for radial adjustment in said holder, an elongated abrasive stone having a backing member rigidly fixed thereto, a longitudinal channel formed in one of said members, and a portion on the other member interfitting in said channel in assembled relationship, means releasably securing said members in assembled relationship comprising longitudinally spaced projecting elements on one member entered in tight fitting relationship into longitudinal grooves in longitudinally spaced elements on the other members, said interlocking elements being arranged on the channel side walls of one member and on the adjacent sides of said other member portion, and said elements being spaced longitudinally so as to permit the lateral movement of said member portion into or out of said channel when said members are moved relatively longitudinally sufficiently to disengage said elements.

2. The invention as set forth in claim 1 in which the stone backing member is constructed of softer material than the jaw member and in which the elements thereon are so shaped before assembly that at least some of the material of said backing member is displaced by engagement with said elements on said harder jaw member as said members are moved relatively longitudinally upon assembly into a position to place said elements in said interlocking engagement.

3. A sub-assembly for replaceably mounting a stone in an expansible honing device, comprising a channel member, a guide element on said member having perpendicular guide surfaces for slidably mounting said member in a hone, an elongated abrasive stone having a backing member rigidly fixed thereto, said backing member being interfitted in said channel member in assembled relationship, means releasably securing said members in assembled relationship comprising longitudinally spaced registering elements projecting from the internal side walls of said channel member and from the adjacent walls of said backing member, and said elements on one member being entered into longitudinal grooves in the elements on said other member in interlocking relationship, said elements being spaced so that, as said members are moved relatively longitudinally sufficiently to shift said elements out of registry, said backing member can be moved into or out of said channel laterally, said backing member being constructed of softer material than said channel member, and said elements on said backing member being so shaped before assembly that at least a portion of the material thereof is displaced by a cutting and wedging action of said elements on said channel member upon assembly as said backing member, after first being placed laterally in said channel, is then pressed longitudinally therein to place said elements in interlocking engagement.

4. The invention as set forth in claim 3 in which the elements on said backing member are soft, transverse ribs and the elements on said channel member are hard, spaced, longitudinal ribs, each of which is individually entered into a separate longitudinal groove formed thereby in a transverse rib upon assembly, so that perfect longitudinal alignment of said backing strip with said channel member is unnecessary to effect the interlocking engagement of said elements.

5. The invention as set forth in claim 3 in which the longitudinal spacing of said elements on one member is uniform and the longitudinal dimension of the elements on the other member decreases progressively from one end of the member to the other so that the engagement of the interacting pairs of elements is sequential.

6. The invention as set forth in claim 3 in which the longitudinal spacing of the elements on one member is uniform and the longitudinal spacing of the elements on the other member decreases progressively from one end of the member to the other so that the engagement of the interacting pairs of elements is sequential.

7. A sub-assembly for replaceably mounting a stone in an expansible honing device, comprising an elongated member having a longitudinal channel formed therein, a guide element on said member having perpendicular guide surfaces for slidably mounting said member in a hone, an elongated abrasive stone, a backing strip of substantially rectangular cross-section having one face cemented to said stone, and being fitted into said channel member in assembled relationship, said backing strip being of such thickness as to space said stone outwardly from the bottom of said channel sufficiently so as to be at least flush with said channel member whereby substantially all of said stone can be worn away before the work engages said member, means releasably securing said backing strip in said channel comprising longitudinally spaced, transversely extending ribs on the sides of said backing strip, and longitudinally spaced elements projecting from the channel side walls of said member and entered into longitudinal grooves in said ribs in interlocking relationship, said elements and said ribs being so spaced as to permit the lateral insertion or removal of said backing strip when said backing strip is moved longitudinally in said channel sufficiently to disengage said elements, said backing strip being constructed of softer material than said channel member, and said longitudinal grooves being formed in said ribs by the intersection therewith of said harder elements on said channeled member under longitudinal pressure applied upon assembly to said backing strip after it is inserted laterally into said channel.

References Cited in the file of this patent

UNITED STATES PATENTS

| | | |
|---|---|---|
| 446,074 | Myers | Feb. 10, 1891 |
| 1,621,226 | Welter | Mar. 15, 1927 |
| 1,840,720 | Hutto | Jan. 12, 1932 |
| 1,874,855 | Bates | Aug. 30, 1932 |
| 2,412,419 | Palottsee | Dec. 10, 1946 |